United States Patent [19]

Aldrich

[11] Patent Number: 4,976,293
[45] Date of Patent: Dec. 11, 1990

[54] BUILT UP SEAM FOR PAPERMAKERS FABRIC

[75] Inventor: W. Daniel Aldrich, Starkville, Miss.

[73] Assignee: Niagara Lockport Industries Inc., Quincy, Fla.

[21] Appl. No.: 472,847

[22] Filed: Jan. 31, 1990

[51] Int. Cl.$^5$ .............................. F16G 3/02; D21F 7/10
[52] U.S. Cl. ............................... 139/383 AA; 24/33 P; 162/348; 245/10
[58] Field of Search ....... 139/383 AA, 383 A, 425 A; 24/33 P, 33 K; 162/348, 358, DIG. 4; 245/10

[56] References Cited

U.S. PATENT DOCUMENTS

| | | |
|---|---|---|
| 1,747,272 | 2/1930 | Webb ............................ 139/383 AA |
| 3,851,681 | 12/1974 | Egan ................................. 139/425 A |
| 4,006,760 | 2/1977 | Romanski et al. . |
| 4,103,717 | 8/1978 | Clark . |
| 4,244,084 | 1/1981 | Gisbourne . |
| 4,364,421 | 12/1982 | Martin . |
| 4,862,926 | 9/1989 | Barrette et al. ............. 139/383 AA |

Primary Examiner—Andrew M. Falik
Attorney, Agent, or Firm—Pettis & McDonald

[57] ABSTRACT

A pin seam construction in which cross direction yarns in the area proximal the seam have a cross sectional size greater than the size of the cross direction yarns appearing in the body of the fabric to provide a weave portion of greater thickness proximal the pin seam to protect the seam in use.

6 Claims, 1 Drawing Sheet

BUILT UP SEAM FOR PAPERMAKERS FABRIC

BACKGROUND OF THE INVENTION

It has become increasingly popular to provide papermakers fabrics, particularly press felts, with selectively joinable seams so that the ends of the felt may be brought together and joined on the papermaking machines. This facilitates replacement of the fabrics, which often are very large and stiff and awkward to install when formed as endless belts. In most papermaking fabrics the filaments used for weaving the fabrics are significantly smaller in diameter than those used as pintles in the seams used to hold the ends of the fabric together. This has tended to restrict the use of pin seams to fabrics employing multi-layer weave patterns and has also tended to impose additional stress and wear on the seam area, due to its greater thickness than other parts of the fabric. Such additional stress has resulted from the frequently greater thickness of the pintle than adjacent cross direction yarns and the absence of crimping of the pintle causing an abrupt increase in caliper at the seam, thus causing a bumping or other interference as that seam passes over portions of the papermaking apparatus or through the nip of opposed rollers. These disadvantages have limited the use of the desirable pin seam despite the additional benefits, particularly in ease of installation, that such seamed fabrics provide.

SUMMARY OF THE INVENTION

To overcome the disadvantages of the prior art, it is an object of the present invention to provide an improved seam construction that provides for smoother passage of the seam through the papermaking apparatus. It is another object of the invention to provide such a seam construction that is capable of satisfactory use, even with single layer weave patterns. To achieve these and other objects that will become apparent to those skilled in the art, there is provided a seam construction for use in a papermakers fabric having a plurality of machine direction yarns interwoven with a plurality of cross direction yarns of a predetermined cross sectional size and in which a seam for joining the ends of the fabric is formed by providing a plurality of loops extending outwardly of each end of the fabric in the machine direction, which loops are brought into interengaged relationship for insertion through such loops of a pin to secure the seam. This improved seam construction comprises providing in the weave proximal the seam such cross direction yarns having a cross sectional size greater than said predetermined size, whereby is provided a weave portion of greater thickness proximal the pin seam to protect the seam in use. In various preferred embodiments of this apparatus there may be provided a transition zone proximal the seam in which the cross direction yarns are of a plurality of graduated cross sectional sizes, each greater than said predetermined size.

BRIEF DESCRIPTION OF THE DRAWINGS

This invention will be described in detail below in connection with the drawings in which.

DESCRIPTION OF THE PREFERRED EMBODIMENTS

Figure 1:
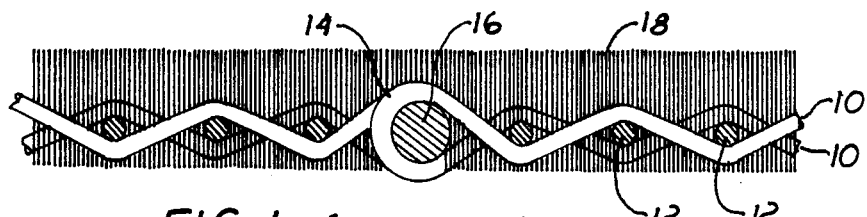
FIG. 1 is a cross sectional view taken longitudinally of a typical prior art pin seamed fabric.

FIG. 1 illustrates a typical prior art application of a pin seam to a single layer papermakers press felt fabric. This is a side sectional view illustrating the machine direction yarns 10, cross direction yarns 12, the interengaged loops 14 to form the pin seam through which the pintle 16 is inserted. Conventional felt batt 18 may also be applied to this fabric. As shown, the cross direction yarns 12 are of a conventional, predetermined cross sectional size, which may be on the order of about 0.30 millimeters diameter, while the pintle 16, to provide both for sufficient strength and for each of handling during the seaming process, is of considerably enlarged size. This is typical of single layer pin seam fabrics of the prior art. While this provides a pin seam of adequate strength, the enlarged diameter of the pintle 16 compared to the cross direction yarns 12 may cause a bumping of the fabric as the enlarged seam passes through press nips and over other rigid portions of the papermaking apparatus. This results in additional stress and wear in the seam area.

In developing the seam of the present invention it was recognized that the wear and stress on the seam might be reduced if the transition in the thickness between the seam area and the remaining portions of the papermakers fabric could be made more gradual. Efforts at achieving this result have been made in the past by folding portions of the fabric over adjacent the seam or by inserting additional layers of fabric in the area proximal the seam. However, the folding technique still results in an abrupt transition, and the insertion of additional layers of fabric requires steps beyond those involved in weaving, requiring considerably more labor to form the fabric.

Figure 3:
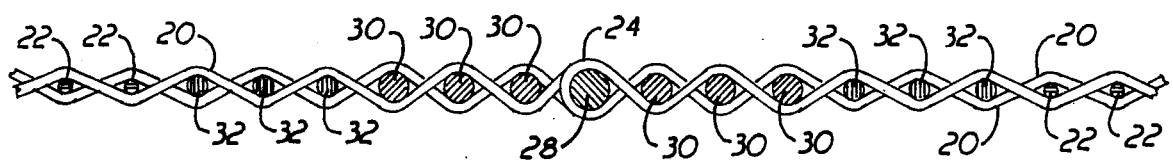
FIG. 3 is a side sectional view of the fabric of FIG. 2, taken along line 3—3.
Figure 2:
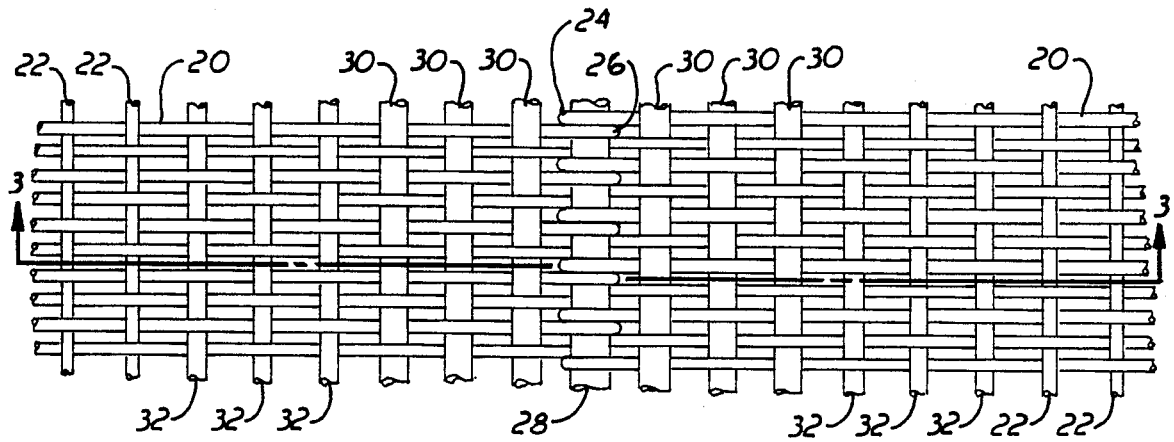
FIG. 2 is a plan view of a papermakers fabric incorporating the improved seam of this invention.

A solution to provide for a more gradual transition in thickness of the fabric proximal the seam in a single layer fabric is illustrated in FIGS. 2 and 3. In the plan view of FIG. 2 and the side sectional view of FIG. 3 may be seen the machine direction yarns 20 interwoven with the various cross direction yarns. These cross direction yarns of the body of the fabric are shown by yarns 22, which are of a predetermined, conventional size, repeated throughout the weave, except in the area immediately proximal the seam.

The seam of this embodiment is formed by the loops 24 extending outwardly of one end of the fabric interengaged with the loops 26 extending outwardly of the opposite end of the fabric, brought together in the interengaged relationship illustrated for insertion of the pin 28 through those loops. As shown, the pin 28 has a cross sectional size greater than the predetermined size of the cross direction yarns 22. To provide a smoother transition between the body of the fabric and the pin seam, there is provided in the weave proximal the seam cross direction yarns 30 having a size greater than the cross sectional size of those yarns 22. This provides a weave portion of greater thickness proximal the pin seam to protect the seam when the fabric is in use. In this embodiment the cross direction yarns also include yarns 32, between the cross direction yarns 22 and those cross direction yarns 30. These yarns 32 are suitably of a cross sectional size intermediate the cross sectional size of cross direction yarns 30 and the size of yarns 22. In this manner there is provided a transition zone in the weave in which the thickness of the fabric increases from the portion of the fabric having cross direction yarns 22 of a first predetermined size gradually up to a second cross sectional size, which may be defined by the pin 28, with a plurality of intermediate size cross direction yarns 30 and 32 intervening. This provides an advantageous seam construction for a single layer fabric.

Figure 4:
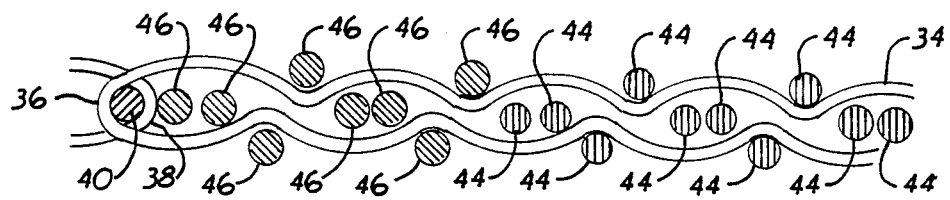
FIG. 4 is a side sectional view of one end of a multi-layer fabric incorporating another embodiment of the seam construction of this invention.
Figure 5:
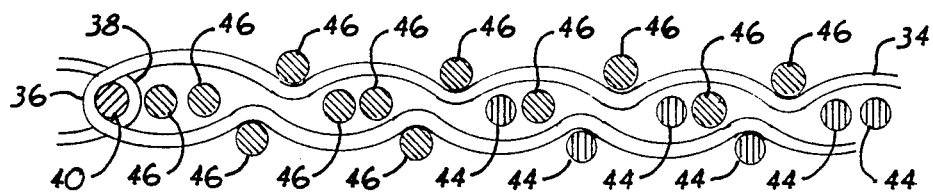
FIG. 5 is a side sectional view of one end of a multi-layer fabric incorporating yet another embodiment of the seam construction of this invention.

As illustrated in FIGS. 4 and 5, a corresponding seam construction, having similar benefits, may be provided for a multilayer fabric. In the embodiment of FIG. 4 there is illustrated a double layer fabric, specifically the portion of one end of the fabric leading up to a pin seam, illustrating the application of the improved seam of this invention. It is to be understood that the portion of the fabric extending to the opposite side of the pin seam may be formed of a similar weave construction. This weave includes machine direction yarn 34 forming loops 36 and 38 in the respective ends of the fabric, which are joined by a pintle 40. The body of the weave incorporates, in addition to the machine direction yarns 34, cross direction yarns 42 having a predetermined, conventional size, which may conveniently be on the order of about 0.40 millimeters. In the portion of the weave proximal the seam the position of these cross direction yarns 42 in the weave is taken by yarns 44 and 46. These yarns 44 and 46 may conveniently have a cross section size of about 0.50 millimeters and 0.60 millimeters, respectively. Thus, in this transition zone between the cross direction yarns 42 and the pintle 40 the caliper of the base fabric would increase from that of the body of the weave by about 0.30 millimeters in the portion using the 0.50 millimeter yarns and by about 0.60 millimeters in the portion utilizing the 0.60 millimeters yarns adjacent the seam. This provides a relatively smooth transition.

If it is desired to make the increase in caliper even more gradual than that of FIG. 4, while still using commonly available sizes of cross direction yarns, such as shown in FIG. 4, the embodiment of FIG. 5 may be used. In this embodiment a plurality of pairs of cross direction yarns are used in the transition zone in which one yarn of each such pair is of a cross sectional size different from the other yarn of each such pair. For simplicity of illustration, only the transition zone of one end of the fabric is illustrated. It is to be understood that the transition zone on the opposite side of the pin seam may be of substantially identical construction, and that the weave outside the transition zone illustrated may comprise cross direction yarns having a cross sectional size of about 0.40 millimeters. As with FIG. 4 the weave includes machine direction yarn 34 forming loops 36 and 38 which are brought into interengaged relationship with loops on the other end of the fabric, with insertion of pintle 40 holding the seam together.

In the embodiment of FIG. 5 the first pair of cross direction yarns in the transition zone may comprise a pair of the yarns 44, which may conveniently have a cross sectional size of about 0.50 millimeters. The next three pairs of cross direction yarns may each comprise one such yarn 44 and another yarn 46, suitably having a cross sectional size of about 0.60 millimeters. Then, the next four pairs of cross direction yarns may all be yarns 46, suitably of a cross sectional size of about 0.60 millimeters. This construction provides an even more gradual transition from the thickness of the body of the weave up to the pin seam than does the embodiment of FIG. 4. In both of these structures the thickness of the weave portion proximal the seam may be at least 20% and may be as much as 40% or more greater than the thickness of the weave portions spaced from the seam. This type of construction of FIG. 5 would be useful where the more abrupt transition of the structure of FIG. 4 might cause objectionable press vibration.

By using the improved seam construction of the present invention, the seam itself, while of greater caliper than the body of the fabric, can be protected from some of its wearing exposure on the paper machine by the inclusion of these larger cross direction yarns. This permits a wider choice of weave patterns and machine direction yarns for use in seamed felts, due to the greater protection of the seams and provides for greater life of the seam due to the protection afforded by the transition zones. Thus, the yarns and weaves of choice, including single layer weaves, can be used for the body of the fabric, with the only changes being made in the weave adjacent the area of the seam. Thus, standard warp yarns can be used for the body of the felt with special yarns drawn in only proximal the seam.

It is to be understood that any number of combinations of yarn types and arrangements of sizes and/or graduations may be used with equal facility. It also to be understood that numerous other variations and modifications of this seam construction, all within the scope of this invention, will readily occur to those skilled in the art. Accordingly, the foregoing is intended to be descriptive only of the principles of the inventions and is not to be considered limitative thereof. The scope of this invention is to be defined solely by the claims appended hereto.

What is claimed is:

1. In a papermakers fabric having a plurality of machine direction yarns interwoven with a plurality of cross direction yarns of a predetermined cross sectional size and in which a seam for joining the ends of the fabric is formed by providing a plurality of loops extending outwardly of each end of the fabric in the machine direction, which loops are brought into interengaged relationship for insertion through such loops of a pin, the improved seam construction comprising providing in the weave proximal the seam said cross direction yarns having a cross sectional size greater than said predetermined size, whereby is provided a weave portion of greater thickness proximal the pin seam to protect the seam in use.

2. The weave construction of claim 1 wherein said cross direction yarns proximal said seam comprise a transition zone in said weave in which said cross direction yarns are of a plurality of cross sectional sizes greater than said predetermined size.

3. The seam construction of claim 2 wherein said plurality of cross sectional sizes are graduated from said predetermined size spaced from said seam to a second, larger size adjacent said seam.

4. The seam construction of claim 3 wherein the cross sectional size of said pin defines said second cross sectional size.

5. The seam construction of claim 2 wherein said yarns in said transition zone comprise a plurality of pairs of yarns in which one yarn of each said pair is of a cross sectional size different from the other yarn of each said pair.

6. The seam construction of claim 1 wherein said thickness of said weave portion proximal said seam is at least 20 percent greater than the thickness of weave portions spaced from said seam.

* * * * *